Sept. 20, 1932.  C. W. CROUSE  1,878,383

FLOOD WATER CONTROL

Original Filed Sept. 30, 1929

Charles W. Crouse  Inventor

By  H. S. Amstutz

Attorney

Patented Sept. 20, 1932

1,878,383

UNITED STATES PATENT OFFICE

CHARLES W. CROUSE, OF VALPARAISO, INDIANA

FLOOD WATER CONTROL

Application filed September 30, 1929, Serial No. 396,234. Renewed August 8, 1932.

My invention relates to improvements in flood water control, and it more especially consists of the features pointed out in the annexed claim.

The purpose of my invention is to control the water of excessive rains so as to check the flooding of arable land; prevent erosion caused by the rapid flow of uncontrolled water; conserve fertility of the soil through the deposit and settling of valuable mineral constituents which would otherwise be carried away down stream; to impound water for irrigation purposes; to hold moisture over selected areas of soil; and to attain these ends through the use of specially constructed intakes for culverts located in roadway embankments or special fills where the fall of a water course is such that impounded water will spread back over the desired area.

With these and other ends in view, I illustrate in the accompanying drawing such instances of adaptation as will disclose the broad features of my invention without limiting myself to the specific details shown thereon and described herein.

Figure 1:
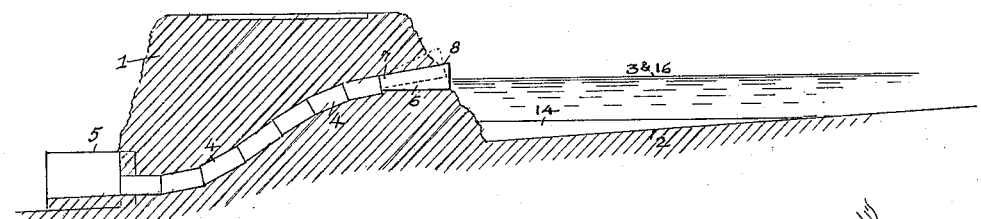
Figure 1 is a cross section of an embankment and adjacent sloping area protected by my control device.
Figures 2, 3:
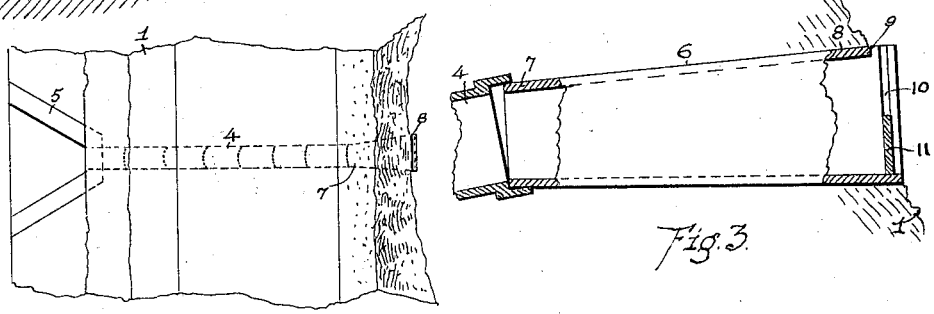
Fig. 2 is a plan view of Fig. 1.
Fig. 3 is an enlarged elevation in section of a control intake.
Figure 4:
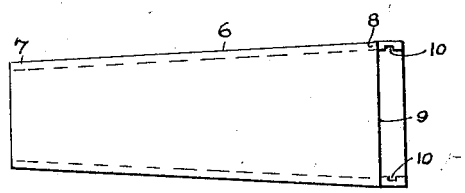
Fig. 4 is a plan view of Fig. 3.
Figure 5:
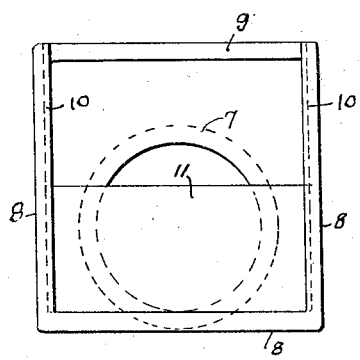
Fig. 5 is a front elevation of Fig. 3.

When installing my flood control in different localities I may use such equivalents and alternatives of construction as the exigencies of varying conditions may demand without departing from the broad spirit underlying the invention.

Within the experience of many agriculturalists, it has been noted that water courses having a more or less rapid flow will in flood times spread over their banks causing damage to the soil and growing crops forming lateral depressions, thus eroding the soil into deep ditches which in time will destroy the value of the ground and make it useless for farming purposes.

I overcome these tendencies by utilizing the existing embankments of public or private roads, or specially formed embankments to impound flood waters in a controllable manner so that the settlings will enrich the soil instead of being swept down stream to silt up the water course at bends, and thus cause the water to wash away the earth from the opposite bank.

Instead of the ordinary open culvert I use a spillway with a special inlet as a single line, or if desired more than one line may be used. In this way the installation may be more readily standardized, avoiding the use of many different sizes of pipe and inlets.

The functioning of my system is extremely simple, in that the change of inlet levels is very infrequent, probably at ten year intervals. At the beginning of an installation the intake is set at least a foot above the level of the area to be served. When this height has been filled by deposits the intake can be raised another foot or more as desired. As stated these intervals may be ten or more years apart.

In the drawing an embankment is shown at 1. It is placed across a water course with a downstream slope at 2. The overflow water level is indicated at 3 and the pipe or tile spillway at 4. The outlet 5 of the spillway may be of concrete with flaring sides. The intake 6 at the beginning of an installation is usually laid so that its under side is level. It has a small round end 7 which is seated in the entrance to the spillway and a large square end 8. This insures that it will always be installed in proper position so that the open top portion 9 will be uppermost. This square end has inside grooves 10 in which a sliding gate 11 is placed. The gate 11 may simply be sections of plank, one or more as desired.

The purpose of the gate is to permit of a rapid run off of excess water. Should too great a depth of water stand on the protected area for too long a time the soil may become water logged. To prevent this the gate 11 may be raised or removed altogether thus permitting the excess depth of water to flow away from the spillway 4. When the intake is raised as shown by dotted lines on Fig. 1 a new water level will be secured.

The area of the large end of the inlet is approximately twice that of the cross section of the reduced size opening 7, and the area of the gate is approximately the same as that of the small end outlet 7 leaving a clear space above the gate of about the same area through which the overflow water can pass on its way down stream. At a desired location below the first embankment other embankments may be formed across the main water course and others may be built across tributaries, as desired. Should it be desired to use any of the impounded water for specific irrigation below the embankment any desired outlet may be placed across it and a shut off attached.

It may be desired under certain circumstances to form the inlet pipe 12 of two passages 19 and 20 one above the other to avoid opening the embankment 1 to raise the intake to a higher elevation. Where so raised the lower intake 19 may be permanently closed. The passageways may be duplicates of each other except that the upper one 20, enters the lower one at 13 at a slight distance from its small end 7.

Figure 6:
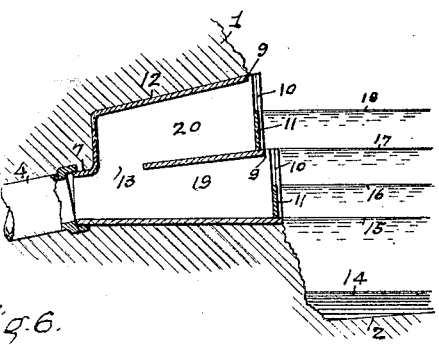
Fig. 6 is an elevation in section of a two passage intake.
Figure 7:
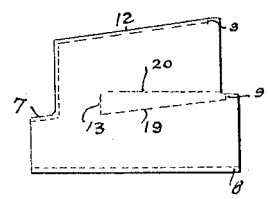
Fig. 7 is a modification of Fig. 6.

Fig. 6 shows the accumulated silt at 14, the first water level at 15, second level at 16, third level at 17 and fourth level at 18.

What I claim is:

In flood water controls, an embankment across a water course, a spillway through the embankment terminating at a lower level than the intake, an intake to the spillway comprising a pair of passages positioned one above the other, a baffle wall between the passages having an opening connecting the two passages adjacent a single outlet leading from the lower passage, and adjustable means at the entrance of each passageway for restricting flow therethrough.

In testimony whereof I affix my signature.

CHARLES W. CROUSE.